United States Patent [19]

Oomen

[11] 3,778,731

[45] Dec. 11, 1973

[54] TUNING METHOD FOR T-NETWORK COUPLERS

[75] Inventor: Johannes A. F. Oomen, Rotterdam, Netherlands

[73] Assignee: Cincinnati Electronics Corporation, Evandale, Ohio

[22] Filed: June 5, 1972

[21] Appl. No.: 259,427

[52] U.S. Cl. .................................... 333/17, 333/32
[51] Int. Cl. ............................................ H03h 7/40
[58] Field of Search ................................ 333/17, 32

[56] References Cited

UNITED STATES PATENTS

| | | | |
|---|---|---|---|
| 3,390,337 | 6/1968 | Beitman, Jr. | 333/17 M X |
| 3,601,717 | 8/1971 | Kuecken | 333/32 X |

*Primary Examiner*—Paul L. Gensler
*Attorney*—Allan M. Lowe, Robert L. Price and J. Ralph King

[57] ABSTRACT

Disclosed herein is a method for tuning a T-network coupler and matching an antenna to a transmitter output. With both input and output inductances of the coupler at values such that the impedance is in a capacitive region of the Smith Chart and within a predetermined resistance circle (say 50 ohms) the value of the output inductance is first increased until said resistance circle is traversed (moving in the direction of less resistance), as sensed by a loading or resistance detector. The input inductance is then increased until the resistance value again traverses said resistance circle, going in the direction of greater resistance. The resistance detector senses this. Then the first and second steps are repeated. The process continues until the phase detector indicates that the phase angle is zero. In any case wherein the impedance is in an inductive region the output inductance is decreased only when the resistance is less than that of the load (50 ohms, for example) and the input inductance is decreased only if the resistance is greater than that of the load.

7 Claims, 5 Drawing Figures

TUNING METHOD FOR T-NETWORK COUPLERS

BACKGROUND OF THE INVENTION

An antenna coupler network is frequently used between a transmitter output and an antenna for purposes of tuning and optimum power transfer. That is to say, the coupler network is employed in order to tune to any selected one of a large number of channels and in order to match the antenna to the transmitter output. A typical antenna coupler is shown in U.S. Pat. No. 3,390,337, issued June 25, 1968, to B. J. Beitman, Jr., assignor to Avco Corporation.

The present invention is a method for tuning a T-network coupler consisting of an input series inductance, a shunt capacitance, and an output series inductance, arranged in a T formation and collectively referred to as a T-network. In the tuning of such a system the error signals or orders are derived from loading (i.e., resistance) and phase detectors. The objective is to tune the coupler so that the transmitter sees a predetermined load, say 50 ohms, for purposes of matching, and so that the load is purely resistive, with a phase angle of zero, indicating the absence of reflections. Whenever a tuning condition is approached by successive adjustments of the inductance parameters, stray capacitance, acting as a shunt on the input to the coupler network, has an adverse effect, upsets mathematical predictions of performance, and may even prevent tuning.

The primary object of the present invention is to provide a method for so utilizing the orders provided by the loading and phase detectors, adjusting output and input inductances in iterative fashion, as to accomplish tuning.

For a better understanding of the present invention, together with other and further objects, advantages and capabilities thereof, reference is made to the following description of the accompanying drawings.

DETAILED DESCRIPTION OF THE INVENTION

Figure 1:
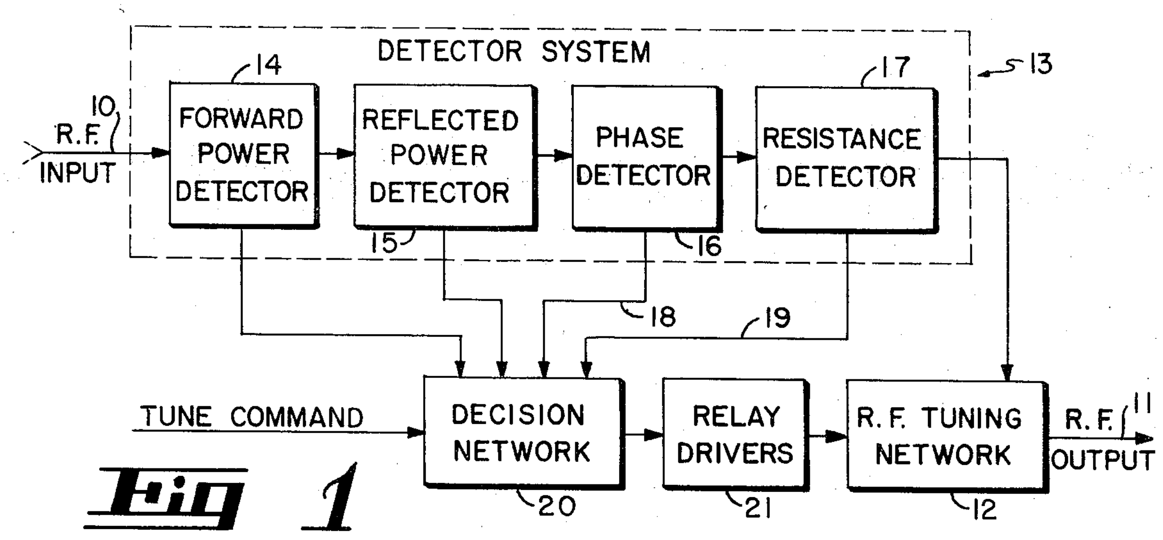
FIG. 1 is a schematic diagram, in block form, of an antenna coupler system adapted to be adjusted to a tuned and matched condition by the method of the present invention.

In FIG. 1 the reference numeral 10 designates the radio frequency output of a transmitter. Line 11 is the output of the antenna coupler system included in block 12. That output is adapted to be coupled to an antenna. Included in the tuning network 12 is a T-coupler in accordance with FIG. 2, or, a more elaborate coupler such as that illustrated in FIG. 5. The FIG. 2 coupler is selected for purposes of illustration and description. Between the R.F. input 10 and the tuning network 12 is a detector system 13 which comprises a forward power detector 14, a reflected power detector 15, a phase detector 16, and a resistance or loading detector 17. The forward power detector and reflected power detector are utilized to furnish an indication of the voltage standing wave ratio (VSWR) and to aid in reaching a matched condition. These need not be further discussed herein in that forward and reflected power meters and VSWR indicators are well known to those skilled in the art. See for example the U.S. Pat. to Griffin and Perrero No. 3,666,883 issued Jan. 30, 1968, and assigned to the same assignee as the present application and invention.

In the practice of the present invention the phase detector 16 performs the function of indicating whether the output impedance is capacitive or inductive. The resistance detector 17 performs the function of indicating whether the resistive part of the load is greater than that appropriate for match, or less than that appropriate for match. The data from the phase and resistance detectors are applied, via lines 18 and 19, to a decision network 20, which, operating through a system of relay drivers 21, causes the various inductances in tuning network 12 to be appropriately adjusted for conditions of tuning and match, working through an iterative process. In the alternative, the inductive parameters in network 12 can be adjusted manually. The details of the decision network need not be shown herein because such networks are well known to those of ordinary skill in the art. For example, in U.S. Pat. No. 3,509,500 to Robert J. McNair, George Bruck and Sheldon Hoffman, dated Apr. 28, 1970, specifically in FIG. 2 thereof, there is shown a circuit that inserts successive values of a reactive parameter until a tuned condition is achieved. The present invention is a novel method of tuning. Once this method is taught, various circuits for practicing it either manually or automatically will be apparent to those of ordinary skill in this art.

Figure 2:
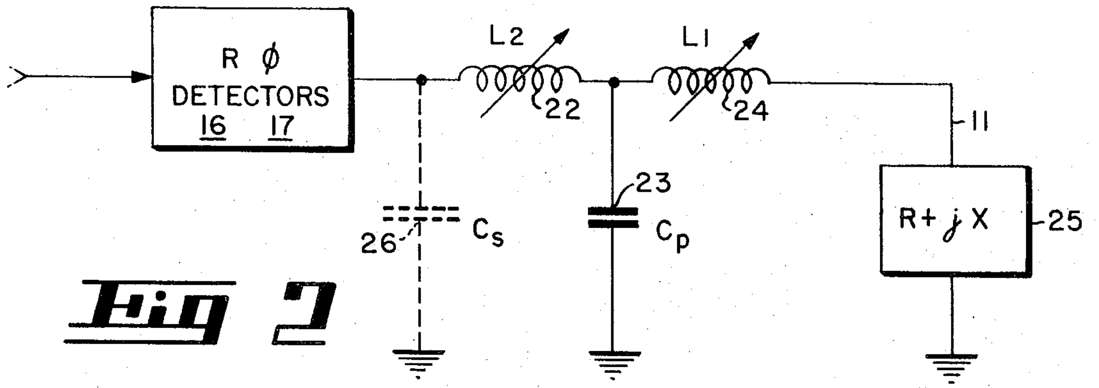
FIg. 2 shows a simple form of T-network adapted to be tuned by the method of the present inventoin.

Referring now to FIG. 2, there are shown a series input inductance 22, a shunt capacitor 23, and a series inductance 24, comprising a T-coupler, incorporated in a system between the phase and resistance detectors 16, 17 and a load 25, i.e., an antenna. The elements 22, 23 and 24 of FIG. 2 will be understood to be incorporated in the block 12 of FIG. 1. The T-coupler of FIG. 2 is conventionally incorporated in a servo system which is used to adapt the coupler automatically to various loads and frequencies. The servo system derives its information basically from the resistance detector 17 and the phase detector 16. When the tuning is iterative, then the stray capacity 26, which shunts the coupler input, has an adverse effect on the tuning ability. The method of the invention overcomes this effect.

Figure 4:
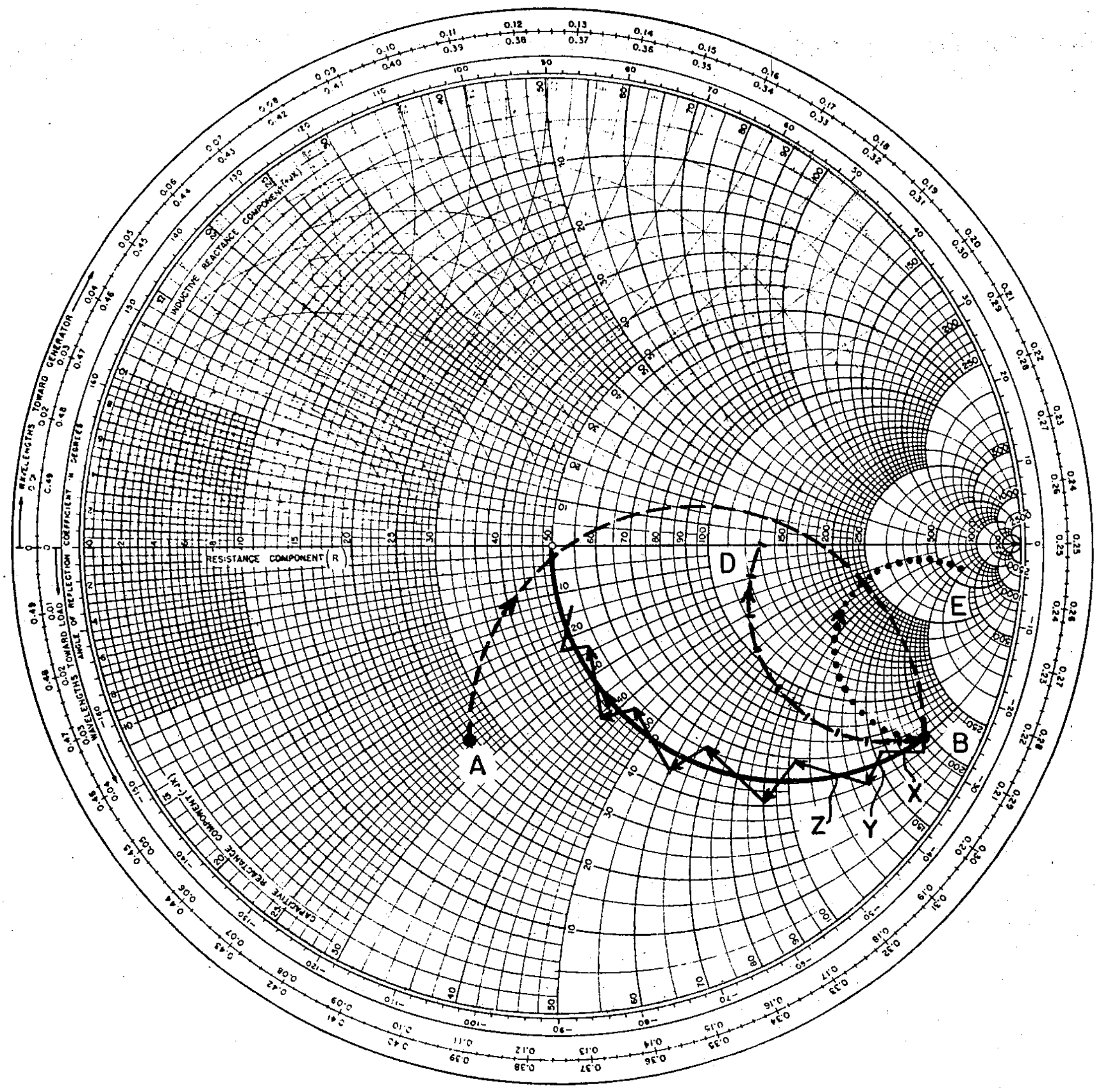
FIG. 4 is a Smith Chart showing how the impedance values are moved, in accordance with the method of the present invention, from a starting point toward a matched and tuned condition.

The invention is particularly useful in an arrangement in which the two series inductances 22 and 24 are variable and the shunt capacity 23 is band switched. The utility of the invention becomes apparent upon a consideration of the prior art iterative procedure. The conventional tuning procedure followed the steps now described. Assuming a starting point or impedance value at A of FIG. 4, the impedance as seen by the resistance and phase detectors with both inductors 22 and 24 at minimum value, the prior art called for inductance 24 to be increased until point B is reached, as recognized by the resistance detector. Thereafter the input inductance 22 would be increased and theoretically the impedance would follow the predetermined load impedance circle (here the 50 ohm circle) until the phase angle equals zero, signifying a tuning of the system to 50 ohms, for example. However, this assumes that the stray input capacity of the network is zero. The prior art theory is upset by the stray capacitance 26 which moves the impedance values to D or E, for example (FIG. 4) into a higher resistance region as input inductance 22 is increased. This causes the impedance to be greater than 50 ohms when the phase angle is zero. The prior art solution is to go back to inductor 24 and increase its value further until the load resistance equals 50 ohms, then to decrease inductance 22. However, for certain values of the stray capacity the curve traced by varying inductance 22 will never find a point where the phase angle is equal to zero and the system will refuse to tune.

Figure 3:
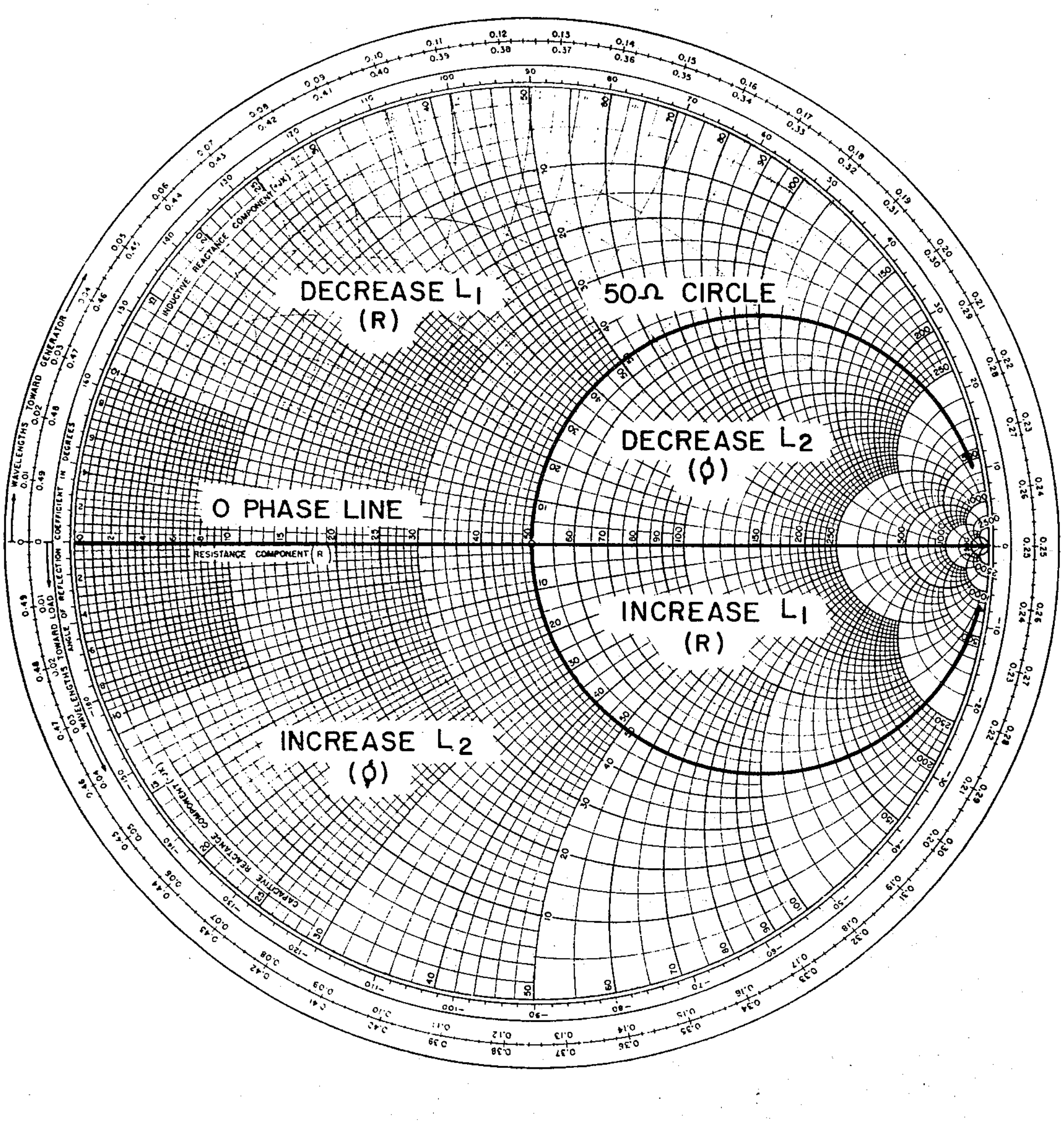
FIG. 3 is a Smith Chart with legends and an illustrative resistance circle showing the constraints imposed by the method in accordance with the invention.

The invention provides a method of tuning iteratively even when the stray input shunt capacitance has a large value. Assume a starting point in the capacitive region within the 50 ohm circle. In accordance with the invention inductance 24 is increased until the 50 ohm circle is traversed, going in a direction of lesser resistance. The resistance detector senses the traversal. Then inductance 22 is increased until the 50 ohm circle is again traversed, going in the direction of increasing resistance. See X in FIG. 4. Again, the resistive detector senses the traversal. This process is continued, the progression of the impedance being in a staggered line, X, Y, Z, etc. (X and Z for increase of inductance 22 and Y for an increase of inductance 24), generally following the 50 ohm circle, until the phase detector indicates the attainment of a phase angle of zero. That is, for capacitive conditions the output inductance is increased if the resistance is greater than 50 ohms. The input inductance is increased if the resistance is less than 50 ohms. Similarly, for the inductive regions, if the resistance is less than 50 ohms, then input inductance 22 is decreased. If the resistance is greater than 50 ohms, then the output inductance 24 is decreased. The constraints imposed by the invention are illustrated in FIG. 3.

Figure 5:
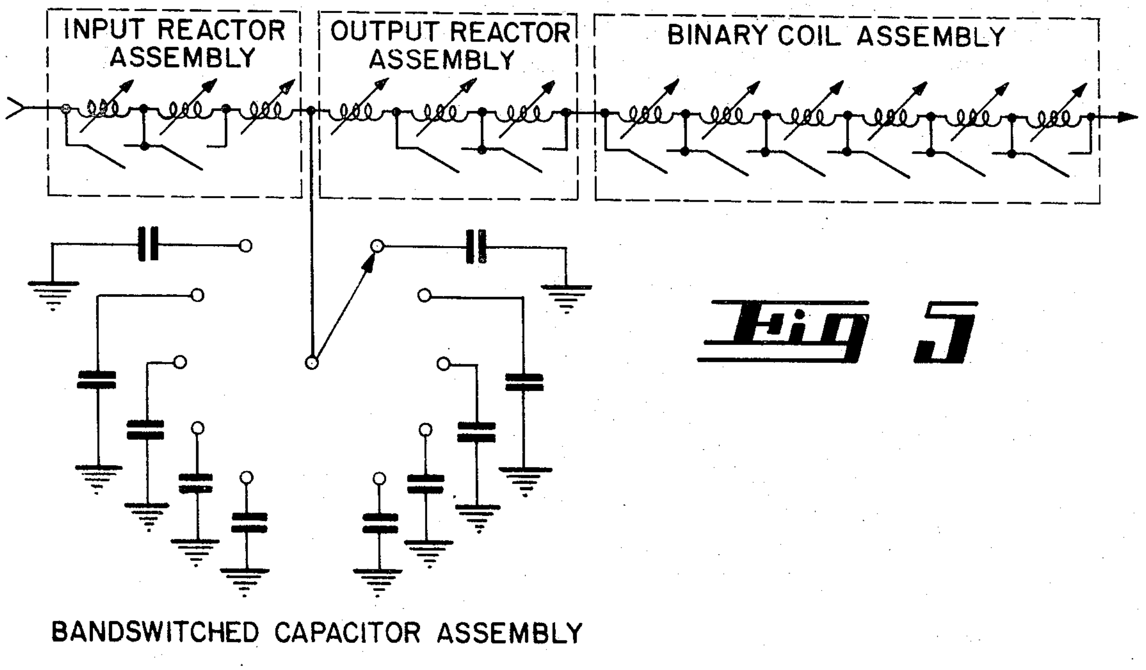
FIG. 5 illustrates in symbolic form a more complex type of T-coupler used in practicing the method of the invention.

In FIG. 5 there is shown an alternate form of coupling network in which the capacitive parameter is any one of a number of discrete capacitors which can be switched into place, depending on the band of frequencies involved. The input inductance is made up of three reactances, all variable. Some may be individually shorted out as shown. The output inductance consists of an output reactor assembly of similar character in series with a binary coil assembly. When the FIG. 5 network is inserted in block 12 of FIG. 1 the coupler may be programmed for a variety of frequency bands.

While there has been shown what is at present considered to be the preferred embodiment of the invention, it will be understood by those skilled in the art that various modifications and changes may be made therein without departing from the scope of the invention as defined by the appended claims.

I claim:

1. A method of matching an r.f. load to a source so that there is presented to the source an impedance having predetermined real and reactive values, a tuning network being connected in circuit with said source and load, said network including an input inductor and an output inductor, said inductors being connected in series between the source and load and a capacitor shunting a connection between the inductors, the method comprising: (1) sensing the real and reactive components presented to the source, (2) in response to the sensed real and reactive components deviating from the predetermined values, adjusting one of the inductors until the sensed real value crosses the predetermined real value in a first direction, (3) then in response to the then sensed reactive component deviating from the predetermined reactive value adjusting the other inductor until the sensed real value crosses the predetermined real value in the other driection, and (4) then iteratively continuing steps (2) and (3) until the sensed reactive component is at the predetermined value for the reactive component.

2. The method of claim 1 wherein the values of both inductors are varied in the same direction during each of steps (2), (3) and (4).

3. The method of claim 1 wherein: in response to the sensed reactive component being at a phase angle less than the phase angle associated with the predetermined reactive value and the sensed real component being greater than the predetermined real value, increasing the value of the output inductor; and in response to the sensed reactive component being at a phase angle less than the phase angle associated with the predetermined reactive value and the sensed real value being less than the predetermined real value, increasing the value of the input inductor.

4. The method of claim 1 wherein: in response to the sensed reactive component being at a phase angle greater than the phase angle associated with the predetermined reactive value and the sensed real component being greater than the predetermined real value, decreasing the value of the input inductor; and, in response to the sensed reactive component being at a phase angle greater than the phase angle associated with the predetermined reactive value and the sensed real value being less than the predetermined real value, decreasing the value of the output inductor.

5. The method of claim 1 wherein: in response to the sensed reactive component being at a phase angle less than the phase angle associated with the predetermined reactive value and the sensed real component being greater than the predetermined real value, increasing the value of the output inductor; in response to the sensed reactive component being at a phase angle less than the phase angle associated with the predetermined reactive value and the sensed real value being less than the predetermined real value, increasing the value of the input inductor; in response to the sensed reactive component being at a phase angle greater than the phase angle associated with the predetermined reactive value and the sensed real component being greater than the predetermined real value, decreasing the value of the input inductor; and in response to the sensed reactive component being at a phase angle greater than the phase angle associated with the predetermined reactive value and the sensed real value being less than the predetermined real value, decreasing the value of the output inductor.

6. A method of matching an r.f. load to a source so that there is presented to the source an impedance having predetermined real and reactive values, a tuning network being connected in circuit with said source and load, said network including an input reactance and an output reactance, said reactances being of the same type and connected in series between the source and load and having a range of values over which they are variable between a low limit value and a high limit value, a shunt reactance of a type opposite from the type of reactances of the input and output reactances, said shunt reactance being connected between the input and output reactances, the method comprising: initially setting both the series reactances at one of the limit values thereof, both of said limit values being in the same direction, sensing the real and reactive impedance components seen by the source, varying one of said series reactances toward the other limit value until the sensed real component passes through the predetermined value therefor in a first direction, varying the other series reactance toward the other limit value until the sensed real component passes through the predetermined value therefor in the other direction, and iteratively repeating the previously defined varying steps in sequence until the predetermined value of the reactive component is sensed.

7. The method of claim 6 wherein both of the series reactances are inductors and the shunt reactance is a capacitor and wherein the inductors are initially set at low limit values therefor, and the values of the inductors are increased during each of the varying steps.

* * * * *